(12) United States Patent
Boos

(10) Patent No.: US 7,412,217 B2
(45) Date of Patent: Aug. 12, 2008

(54) TRANSCEIVER WITH INTERFERENCE SIGNAL REJECTION, AND METHOD FOR INTERFERENCE SIGNAL REJECTION

(75) Inventor: Zdravko Boos, München (DE)

(73) Assignee: Infineon Technologies AG, Munich (DE)

( * ) Notice: Subject to any disclaimer, the term of this patent is extended or adjusted under 35 U.S.C. 154(b) by 464 days.

(21) Appl. No.: 11/109,514

(22) Filed: Apr. 19, 2005

(65) Prior Publication Data
US 2005/0245216 A1    Nov. 3, 2005

(30) Foreign Application Priority Data
Apr. 22, 2004    (DE) .................. 10 2004 019 587

(51) Int. Cl.
*H04B 1/04* (2006.01)
*H04M 1/00* (2006.01)

(52) U.S. Cl. ............... 455/129; 455/114.2; 455/115.1; 455/269; 455/296

(58) Field of Classification Search .............. 455/129, 455/130, 67.11, 67.13, 501, 114.2, 115.1, 455/226.1, 269, 296, 341; 709/238
See application file for complete search history.

(56) References Cited

U.S. PATENT DOCUMENTS
4,688,245 A    8/1987    Schenk

2005/0132087 A1 *   6/2005   Glinski et al. ............... 709/238
2006/0133519 A1 *   6/2006   Tsatsanis et al. ............ 375/260

FOREIGN PATENT DOCUMENTS
DE    199 34 502 A1    1/2001
DE    103 17 600 A1    11/2004
EP    0 691 756 A1    1/1996

* cited by examiner

*Primary Examiner*—Tony T Nguyen
(74) *Attorney, Agent, or Firm*—Eschweiler & Associates, LLC

(57) ABSTRACT

A transceiver with interference signal rejection has a transmission path and a reception path. The transmission path is connected to a transmission amplifier whose output is coupled to an antenna. In addition, the antenna is also connected to the reception path. A compensating apparatus is provided which is coupled to an input of the reception path. The output of the transmission path and the input of the transmission amplifier also have an extraction element connected between them which is connected to an input of the compensating circuit. A signal component of a transmitted signal is extracted before amplification to an output level and is routed to the reception path via the compensating circuit such that this compensates for a crosstalk transmitted signal component.

20 Claims, 5 Drawing Sheets

TRANSCEIVER WITH INTERFERENCE SIGNAL REJECTION, AND METHOD FOR INTERFERENCE SIGNAL REJECTION

REFERENCE TO RELATED APPLICATIONS

This application claims the benefit of the priority date of German application DE 10 2004 019 587.0, filed on Apr. 22, 2004, the contents of which are herein incorporated by reference in their entirety.

FIELD OF THE INVENTION

The invention relates to a transceiver with interference signal rejection and to a method for rejecting crosstalking signal components in a transceiver.

BACKGROUND OF THE INVENTION

In modern mobile communication appliances, which are designed for a simultaneous transmission and reception mode, the problem may arise that a signal for transmission is injected into the reception path from the transmission path. An injected signal increases the probability of error when the received signal is demodulated, or even prevents reception entirely. This problem becomes greater, the greater the level differences are between a received signal and the transmission signal. If the mobile station is at a very great distance from a base station, for example, transmitted signals need to be radiated from the mobile appliance to the base station at relatively high power. At the same time, however, the signals which are transmitted by the base station are received only at a very low power, which means that a large power or level difference is obtained. The example of the mobile radio standard UMTS is intended to be used to explain this problem in more detail.

In the specification TS25.101, the UMTS standard defines the frequency ranges and various power classes which are characterized by a maximum output power. By way of example, a transmitter for UMTS signals in the mobile communication appliance is able to radiate a signal at an output power of 24 dBm, and at the same time the receiver in the mobile communication appliance can receive a signal at −90 dBm. The interval between transmission frequency and reception frequency is 190 MHz. To prevent injection at this frequency interval on account of the large level differences between the transmitted signal and the received signal, conventional transceivers use a duplexer. This is usually formed with a circulator and routes the transmitted signal sent by the transmission path to the antenna, where it rejects the transmitted signal in the direction of the reception path. In conventional duplexers, the rejection is approximately 45 dB, which in the example cited above still results in the transmitted signal being injected into the reception path at a level of −21 dBm.

To reduce the level of the crosstalking signal even more, further measures are accordingly required. In the embodiment which is shown in prior art FIG. 4 and which is known to the applicant, narrowband SAW filters 88 are additionally used. These are connected both to the transmission path 2 and upstream of the reception path 3. In particular, an SAW filter 88 is connected downstream of a reception amplifier 33a and upstream of the input of the reception path 3.

The SAW filter connected to the transmission path is used for rejecting any image frequencies there may be, on account of the mixing process in the transmission path and for rejecting intermodulation products. The narrowband SAW filter, which is connected to the output of a reception amplifier 33a, has a typical attenuation of approximately 25 to 30 dB and thus rejects the remaining crosstalking signal to a level of −45 to −51 dBm. The amplifier 33a is needed in order to compensate for the additional attenuation of the SAW filter 88 within the useful signal band and to decouple the duplexer 7a from the SAW filter 88. This means that the signal-to-noise ratio for the received signal is improved in the useful signal band. The narrowband SAW filters used are very expensive to produce in the frequency range of approximately 2 GHz which is used, however. This increases both the cost and the space taken up by a transceiver for UMTS signals.

Another possibility is demonstrated by the printed document DE 199 34 502. In this document, a compensating element is connected in parallel with the antenna to the output of a transmission amplifier and upstream of the input of the reception amplifier. Appropriate control of the compensating element allows a signal to be produced which is additively superimposed on a received signal and thus reduces a transmitted signal component on account of crosstalk from the transmission path into the reception path. This embodiment allows the SAW filters to be saved and the costs to be reduced.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a transceiver having improved interference signal rejection where the costs and the power consumption are reduced in comparison with the prior art. The invention also includes a method for rejecting a crosstalking signal component which can be implemented using simple means and at low cost.

The transceiver with interference signal rejection according to one embodiment of the present invention comprises a transmission path and a transmission amplifier connected to the transmission path. There is also a reception path. The transceiver has an antenna which is connected to the input of the reception path and to the output of the transmission amplifier. The transceiver in one example is configured for concurrent operation of the transmission and reception paths, that is to say for concurrently transmitting and receiving, as provided in the mobile radio standard UMTS, for example. The invention also comprises a compensating circuit, in which an input is connected to a coupling element. The coupling element is connected between an output of the transmission path and the input of the transmission amplifier and is configured to extract a portion of the transmitted signal. The compensating circuit is configured to compensate for a transmission-path signal component crosstalking onto the reception path. In this case, the compensating circuit output is coupled to the output of the reception amplifier and is thus connected between the reception path and the antenna.

The transceiver circuit of the present invention is used to extract a portion of the transmitted signal from the transmission path and to supply the extracted signal to the input of the reception path such that interference signals as a result of crosstalk from the transmission path into the reception path are rejected by the supplied signal.

In contrast to the prior art, in the present invention the transmitted signal is extracted within the transmission path prior to amplification by the transmission amplifier. Accordingly, in principle, smaller amplitudes of the transmitted signal component are processed, any influence by the extracted transmitted signal component on elements of the transceiver is reduced, and space is saved as a result of saving additional attenuating elements.

In one embodiment, at least the transmission path, the reception path and the compensating circuit can be produced as an integrated circuit in a semiconductor body without the need for additional measures on account of further interfering effects of the extracted transmitted signal component. This reduces costs and saves space, and it is possible to dispense with the additional SAW filters.

In one embodiment of the invention, an inductive extraction element is provided for extracting a signal component of the transmitted signal, wherein the extraction element is connected between the output of the transmission path and the input of the transmission amplifier. In another embodiment of the invention, the extraction element is formed by a contact wire which is inductively coupled to a signal line connected between the transmission path and the transmission amplifier. The coupling wire may also be used for additionally shielding the signal line of the transmission path that affects extraction and the further signal processing in a current mode. In particular, current-processing signal conditioning is performed for the compensating signal.

In a further embodiment of the invention, the extraction element in the compensating circuit comprises a matching element for impedance matching between an output impedance in the transmission path and an input impedance in the transmission amplifier.

In yet another embodiment of the invention, the compensating circuit contains a detector for measuring power that is coupled to the output of the reception amplifier. In one example, this coupling takes place at a location at which the compensated received signal is already present. In one embodiment of the invention, power detection is performed using a DC signal component that has been produced in the reception path. The DC signal component is obtained from second-order distortion, which is produced automatically as a result of the crosstalk by the transmitted signal into the reception path.

In a further refinement, the compensating circuit contains an adding circuit, to whose inputs a received signal and a compensating signal can be supplied and whose output is coupled to the input of the reception path. In one example, the detector is connected to the output of the adder.

In another embodiment of the invention, the detector comprises a diode rectifier for measuring power that is configured to rectify a signal applied to the input, and the detector providing an appropriate arrangement for measuring the voltage of the rectified signal. In yet another embodiment, the detector contains an analogue/digital converter that converts a signal derived from the signal applied to the input into a digital value and supplies this digital value to a microcontroller for the purpose of control. In this arrangement, the microcontroller is configured to generate control signals in order to alter an amplitude for the extracted component or to shift the phase of the extracted component.

In another embodiment of the invention, the detector has at least two operating states. In a first operating state, the detector and also the compensating circuit are inactive. A crosstalking transmitted signal component is therefore not rejected. In a second operating state, the detector is configured to measure power and the compensating circuit is configured to supply a compensating signal to the reception path in order to reject a crosstalking component from the transmission path.

The operating state is advantageously set by means of power regulation that prescribes the output signal or by a signal that is dependent on the power of the transmitted signal. This advantageously provides the option of activating the compensating circuit only when required. This is the case particularly when the output power of the transmitted signal is very high and at the same time the reception power of a received signal is very low.

If the transmission power of the transmitted signal is low, however, injection into the reception path is also only weak, and there is no need for additional rejection by the compensating circuit. The average power consumption of the transceiver is thus reduced.

In one embodiment, the compensating circuit comprises means for changing the amplitude of an extracted component and for shifting a phase of the extracted component on the basis of the interference-signal power ascertained by the power detector.

In line with the proposed method, a crosstalking signal component in a reception path of a transceiver is rejected by virtue of the component of the transmitted signal which crosstalks into the reception path being ascertained and a parameter being produced therefrom. The parameter is used to set a signal component which is extracted from the transmission path. In this case, the amplitude and the phase of the extracted component are preferably altered such that the crosstalking transmitted signal component is rejected when the component altered in this manner is added to the received signal. The transmitted signal for the rejection is advantageously extracted prior to amplification of the transmitted signal by a transmission amplifier.

In one embodiment of the invention, the amplitude and phase of the extracted signal component are altered in steps and the method is carried out until a minimum is ascertained for the crosstalking component. In one example, this is performed using an algorithm which is used to set the amplitude and the phase of the extracted component.

In one example, the method is carried out on the basis of the output power of the transmission signal. This allows power costs to be reduced if the output power of the transmitted signal does not become too high.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The text below explains the invention in detail using exemplary embodiments with reference to the drawings, in which.

DETAILED DESCRIPTION OF THE INVENTION

Figure 1:
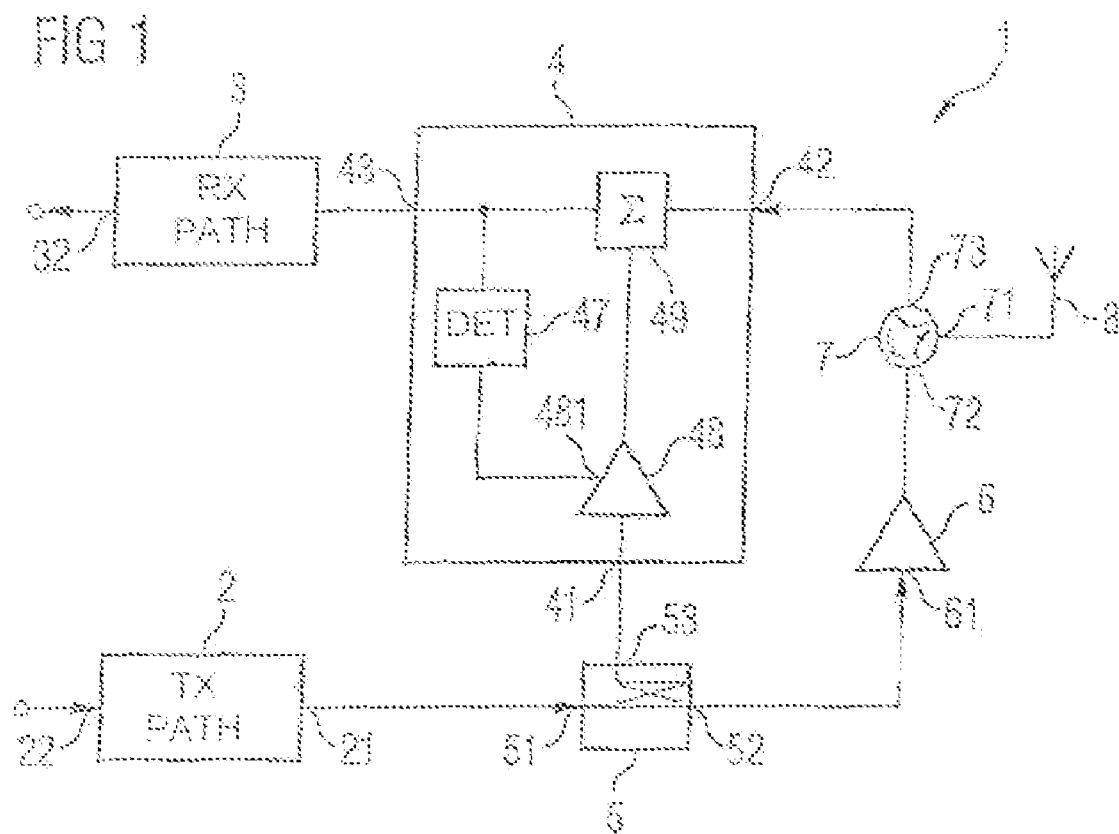
FIG. 1 is a block diagram illustrating one embodiment of the invention.

FIG. 1 shows a block diagram of an inventive transceiver circuit for signal rejection for a signal crosstalking from a transmission path into a reception path. Such a transceiver circuit may be used in mobile communication appliances which can be used for mobile radio standards which have a frequency division duplexing operating mode (FDD operating mode). Examples of an FDD operating mode, in which signals are transmitted at a first frequency and signals are received at a second frequency, are UMTS/WCDMA, CDMA2000 or IS95. The interval between the transmission frequency and the reception frequency is dependent on the individual mobile radio standards. For the mobile radio standard UMTS, it is no more than 190 MHz.

The inventive transceiver comprises a transmitter or transmission path 2 with an input 22 and an output 21. In this case, the transmission path 2 is designed to convert signals applied to the input to the output frequency of the transmitted signal. To this end, it contains a frequency conversion device (not shown for reasons of clarity) which uses a local oscillator signal to convert a signal applied to the input 22 to the desired transmission frequency. The output 21 of the transmission path 2 is connected to a coupling element 5. The coupling element 5 is used to extract a signal component of the transmitted signal and will send it to an output 53. For the extraction, the coupling element 5 contains a contact wire which is inductively coupled to the transmission path. This is done, by way of example, through suitable parallel arrangement of the contact wire with the transmission path. The coupling is designed such that it simultaneously provides shielding for the transmission path against interference signals.

Figure 5A:
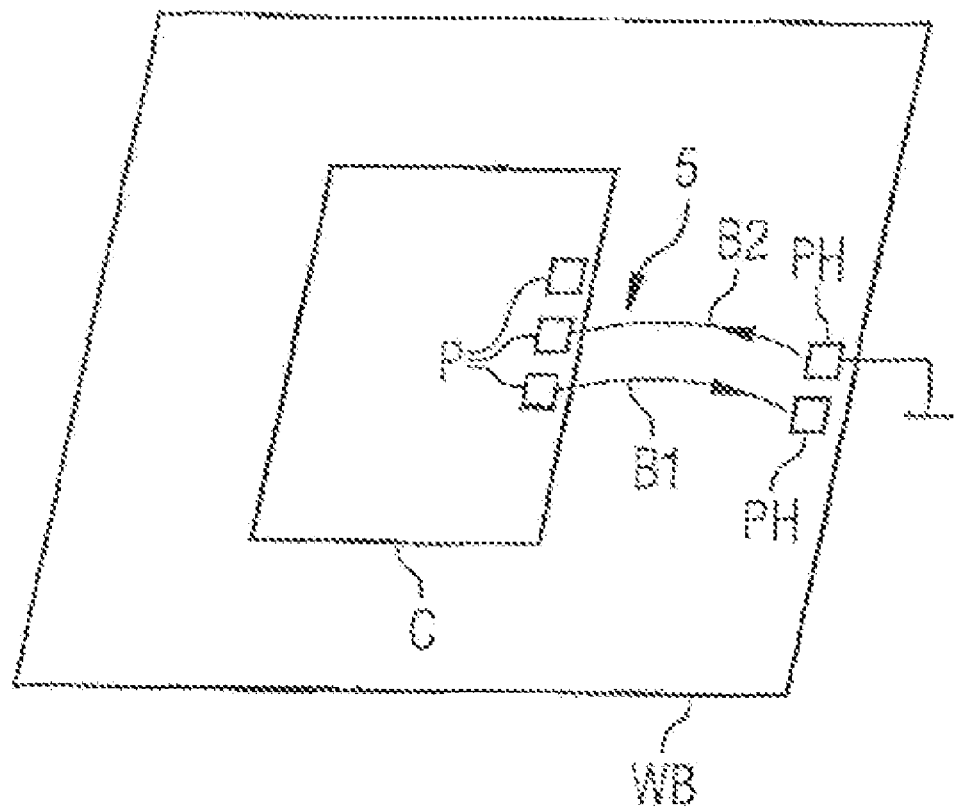
FIGS. 5A & 5B illustrate exemplary coupling elements that may be employed in conjunction with the present invention.
Figure 5B:
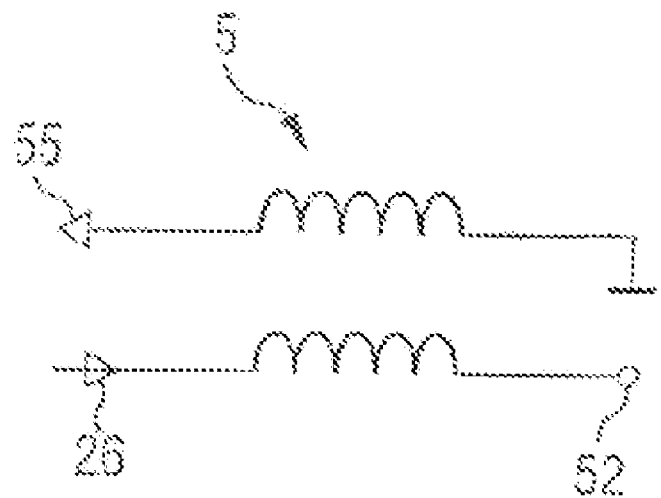

An example of such a coupling wire can be seen in FIG. 5, FIG. 5A. FIG. 5B shows a detail from the equivalent circuit diagram. In this case, the inventive transceiver is implemented in a semiconductor body C. On its surface, the semiconductor body contains a plurality of connection contacts, which are also called pads. The semiconductor body is embedded in a chip module WB. A first connection contact P of the semiconductor body C simultaneously also forms an output of the power amplifier 26, which is likewise formed within the semiconductor body C. Also referring to FIG. 1, a further adjacent connection contact forms the output 53 of the coupling element 5. For signal interchange, the connection contacts P on the surface of the semiconductor body C are connected to appropriate connection pads on the surface of the semiconductor body by means of bonding wires. The coupling element 5 is likewise formed by these bonding wires. The parallel course of the bonding wire B1, which carries the transmitted signal, and of the bonding wire B2 produces a slight inductive coupling. Consequently, in the event of a change of current or a change of signal in the bonding wire B1, a change of current is likewise induced in the bonding wire B2. Depending on the coupling strength of the two bonding wires, this change has different magnitudes.

FIG. 5B shows an equivalent circuit diagram of the inductive coupling. One end of the coupling wire B2 is connected to the ground potential and the other end is connected to a current-amplifying circuit 55. This circuit is produced within the semiconductor body C. The inductive coupling produces a current signal which can be processed further in suitable fashion after amplification. A current signal is desirable because it can easily be added in the summator.

In addition, the coupling element contains matching elements (not shown) which match the impedance of the output 52 to an impedance of an input 61 of a power amplifier 6. The power amplifier 6, whose input is connected to the output of the coupling element, is the transmission amplifier for the transmission signal. This may be not only (as shown) a single transmission amplifier but also a transmission amplifier chain which amplifies the signal for transmission to the desired output power. In one example, amplification is effected in as linear a fashion as possible in order to minimize intermodulation products and hence also the adjacent channel power.

The output of the power amplifier 6 is connected to a circulator 7. Instead of a circulator, UMTS or WCDMA or CDMA transceivers frequently use a duplexer in the form of an SAW (surface acoustic wave) element or a BAW (body acoustic wave) element.

The circulator 7 used in this exemplary embodiment is a passive, nonreciprocal multiport and, in the exemplary embodiment shown, has three input and output ports 72, 71, 73. The arrows shown indicate the forward direction. The ports 72, 71, 73 are connected in the forward direction or in the reverse direction with respect to another port. Specifically, the connection 71 of the circulator 7 is connected in the forward direction for the connection 72, while the connection 73 is connected in the reverse direction for the connection 72. The transmitted signal on the connection 72 is routed with only weak attenuation to the antenna, while it is heavily attenuated on the connection 73 in order to prevent the transmitted signal from crosstalking onto the reception path.

In the case of the circulator 7 shown, the insulation attenuation is normally 45 dB. A transmitted signal applied to the connection 72 at a power of approximately 0 dBm is thus sent to the reception path connected to the connection 73 with attenuation of approximately 45 dB. A signal received via the antenna 8 is supplied to the output 73 and hence the reception path with almost no attenuation.

The connection 73 of the circulator 7 is connected to an input 42 of the compensating circuit 4. The compensating circuit 4 contains an adding element 49 whose first input is connected to the input 42 and whose output is coupled to the output 43 and to a detector 47. A second input of the adding element 49 is connected to an output of a circuit 48. The input of the circuit 48 forms the input 41 of the compensating circuit and is connected to the output 53 of the coupling element 5. The circuit 48 is designed both to amplify a signal applied to the input 41 using an adjustable gain factor and to produce a phase shift by an adjustable phase.

To this end, the circuit 48 contains both an amplifier and an attenuating element and a phase shifter. A gain is set with both a positive and a negative gain factor and a phase shift using the setting input 481, which is connected to the output of the detector 47. The adder 49 forms a sum from the signals applied to the input.

Finally, the output 43 is connected to the reception path 3, at whose output 32 it is possible to tap off a received and demodulated signal. The reception path 3 contains a device for frequency conversion, which is not shown for reasons of clarity. The device for frequency conversion converts the signal applied to the input to an intermediate frequency using a local oscillator signal. The reception path 3 may also contain a demodulation apparatus which demodulates the converted signal.

Rejection of a crosstalking transmitted signal component is achieved by the active rejection by the compensating circuit 4. In this case, the extracted current signal from the transmitted signal component, which the coupling element 5 provides at its output 53 is supplied to the input 41 of the compensating circuit. At the same time, the transmission signal is amplified by means of the transmission amplifier 6 and is radiated on the antenna 8 via the circulator 7. A crosstalking component of the transmitted signal reaches the reception path and the input 42 of the compensating circuit 4. To reduce this component, the amplitude and the phase of the extracted transmitted signal are altered. The signal altered in this manner is supplied to the total signal via the adding element 49. The adding element can be designed particularly easily for current-signal processing. It is therefore advantageous that the coupling element 5 is already extracting a current signal. The compensating circuit 4 thus alters the amplitude and phase of the current signal and then adds it to the received signal.

If the altered signal supplied to the sum has the same amplitude and a phase shift of 180° relative to the crosstalking transmitted signal component, it is compensated for entirely in the adding element 49 through interference formation. An alteration in the crosstalking signal in the reception path is registered by the detector 47 and an appropriate setting signal is sent to the circuit 48.

Figure 2:
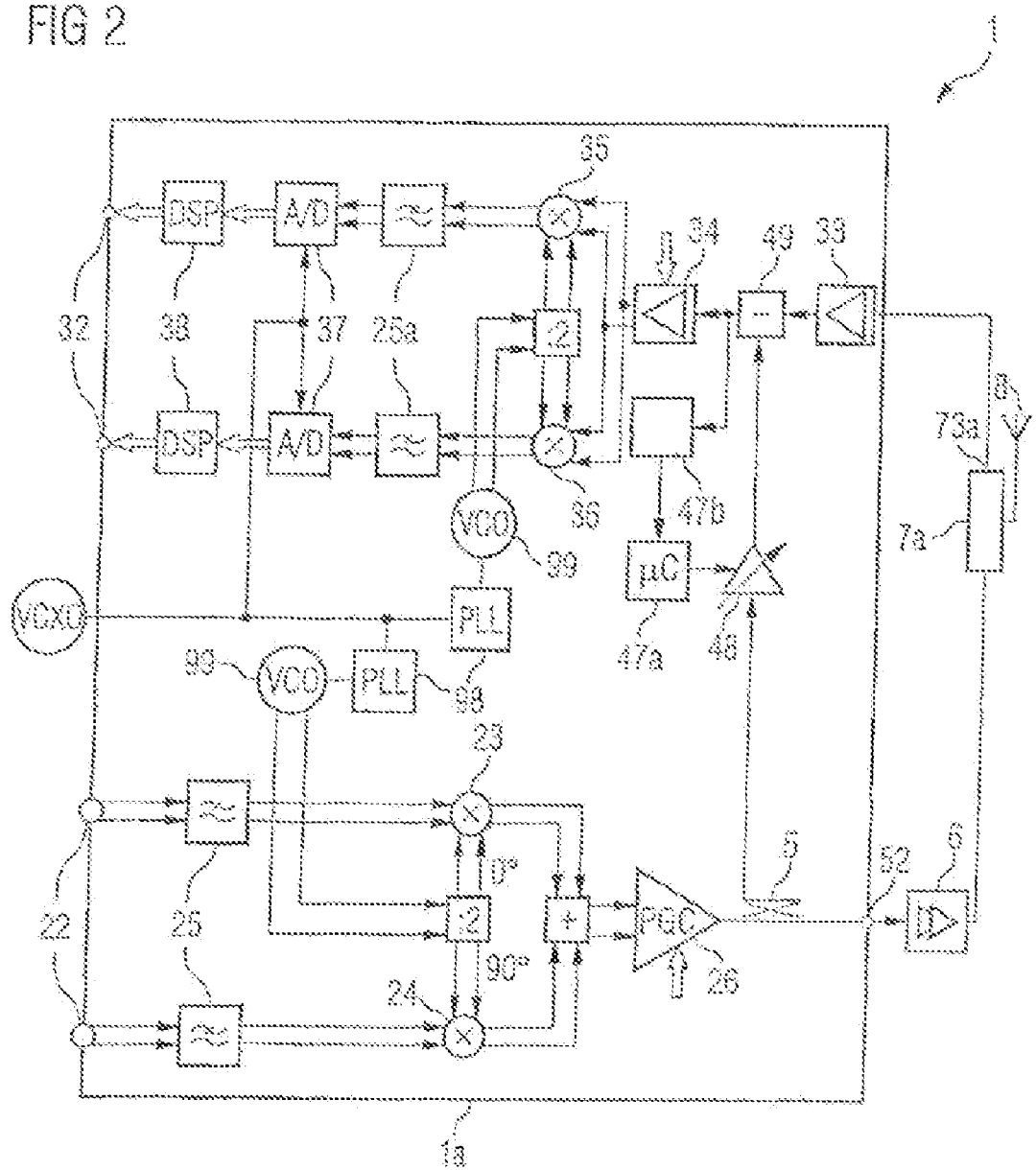
FIG. 2 is a block diagram illustrating another exemplary embodiment of a transceiver in a semiconductor body according to the invention.

A more detailed exemplary embodiment is shown in FIG. 2. In this case, components which have the same function bear the same reference symbols. In this embodiment, all components of the inventive transceiver apart from the power amplifier 6, a duplexer 7a and the antenna 8 are implemented in a semiconductor body 1a. This reduces the space in comparison with the embodiment using discrete elements, and the power consumption is significantly reduced. The input of the transmission path 2 is in this case designed for supplying a signal comprising two components.

Such a signal is also called an IQ signal and comprises a inphase component I and a quadrature component Q. In addition, the transmission path contains a vector modulator which converts the signal comprising the two components I and Q to the output frequency. To this end, the vector modulator, which is also called an IQ modulator, has two mixers 23 and 24 whose inputs are respectively connected to the input connections 22 via a low-pass filter 25. A local oscillator signal derived from a voltage-controlled oscillator 99 is applied to the local oscillator input of the mixer 23. A local oscillator signal phase-shifted through 90° with respect thereto is applied to the local oscillator input of the mixer 24.

Signals applied to the input are converted to the output frequency, to the transmission frequency, using the local oscillator signal from the voltage-controlled oscillator 99, are added and are supplied to a programmable amplification device 26. The latter performs preamplification still within the semiconductor body 1a. The preamplification using the programmable amplification device 26 serves firstly to compensate for the signal attenuation through the extraction which is effected on the extraction element 5 and also to supply suitable signal levels to the transmission amplifier 6.

The extraction element 5, which is connected to the output of the amplifier 26, is simultaneously used for impedance matching the output 52 to the input of the amplifier 6. The output 52 of the extraction element 5 also forms the output of the transmission path at the same time. The coupling element 5 is coupled to the transmission path inductively by means of a contact wire. In contrast to capacitive coupling, inductive coupling influences the signal path of the transmitted signal significantly less. In addition, the current signal which is extracted has a phase which is the inverse of that of the transmitted signal, merely on account of the inductive coupling. The coupling line is additionally used to shield the signal line by virtue of a suitable design.

The output of the duplexer 73a for the reception path is connected to a first low-noise amplifier 33. With suitable design, the low-noise amplifier 33 can also be dispensed with, but in this exemplary embodiment it is used to decouple downstream components from the connection 73a of the duplexer 7a and to improve the signal-to-noise ratio of a received signal. The insertion attenuation in the reception channel which is produced by the duplexer 7a is compensated for using the reception amplifier 33.

The output of the low-noise amplifier 33 is connected to the input of the adding element 49. The output of the adding element 49 is connected to an input of a second low-noise amplifier 34 and also to a power detector 47b. The low-noise amplifier 34 amplifies the compensated received signal applied to the input in order to achieve the level which is required for the further signal processing. The amplified signal is supplied to a vector demodulator which contains two mixers 35 and 36.

The local oscillator inputs of the mixers 35 and 36 have a respective local oscillator signal supplied to them, these signals having a 90° phase shift relative to one another. The received signal is split into its complex-value inphase component I and quadrature component Q by the two mixers and is supplied to an analogue/digital converter 37 via a respective low-pass filter 25a. The vector demodulator is likewise called an IQ demodulator. Following digitalization in the analogue/digital converter 37, digital signal processing takes place in signal processors 38, and a result is sent to the output 32 of the reception path.

The power detector 47b contains a rectifier diode for rectifying the received signal. From the rectified signal, the power detector ascertains the power and supplies its value to a microcontroller 47a. In this case, it is necessary to take into account the temperature dependency of the semiconductor diode. In another embodiment, the power detector actually evaluates the DC signal component in the received signal. Such a component is produced by second-order harmonic distortion. This is obtained when the transmitted signal crosstalks into the reception path. The strength of the DC signal component is therefore a measure of the transmitted signal's crosstalk into the reception path.

The microprocessor 47a uses an algorithm which is stored in it and the data from the power measurement to ascertain an amplitude and a phase for the compensating signal. It supplies this compensating signal to the setting input of the circuit 48, which then alters the amplitude and phase of the extracted signal on the basis of the stipulations.

As a result of the extraction element being produced still within a semiconductor body and upstream of the transmission amplifier 6, the demands on the extraction element 5 and on the downstream compensating circuit become significantly lower. The reason for this is primarily that the amplitude of the signal which is to be extracted is still significantly smaller than that of the transmitted signal. Interfering influences on other components are thus reduced.

If, by way of example, the radiated power on the antenna 8 needs to be 20 dBm and the power amplifier 6 has a gain of 30 dB, it is sufficient to provide a signal at −10 dBm at the output 52. With an extraction attenuation of 10 dB for example, an extracted signal with a total amplitude of −20 dBm is obtained. If the transmission attenuation of the duplexer used is approximately 40 dB, the signal amplitudes of the crosstalking signal in the reception path and of the extracted signal component are of approximately the same size. The extracted signal component now merely needs to have its phase altered by the circuit 48 and needs to be supplied to the adder 49. If the phase difference between the crosstalking component in the reception path and the extracted and altered component is 180°, then the two signals cancel one another out. The detector 47*b* uses its power measurement to ascertain the remaining crosstalking signal component and forwards it to the microprocessor 47*a*.

The latter uses an algorithm to reduce the phase and amplitude of the extracted signal component until the power ascertained by the detector 47*b* is minimal. The microprocessor 47*a* is additionally connected to a control circuit (not shown) for setting the gain factor of the transmission amplifier 6. Forwarding of the extracted signal component by the circuit 48 to the adder 49 is controlled by means of the microprocessor 47*a* such that a signal altered by the circuit 48 is supplied only in the event of transmitted signals which are above a particular level. The detector 47*b* and the circuit 48 are thus activated via the microprocessor 47*a* only if the signal for transmission is above a particular level. By way of example, the particular level may be 80% to 90% of the maximum transmission level. This saves power, since at low transmission levels, which occur much more frequently, the rejection by the duplexer 7*a* is already adequate.

Besides an output power for the transmission signal, further parameters may be used for or against the decision to compensate. Since the crosstalking component in the reception path results in an increase in the error rate of demodulated signals, it may moreover be expedient to evaluate the error rate and to take this into account in a decision.

Figure 3:
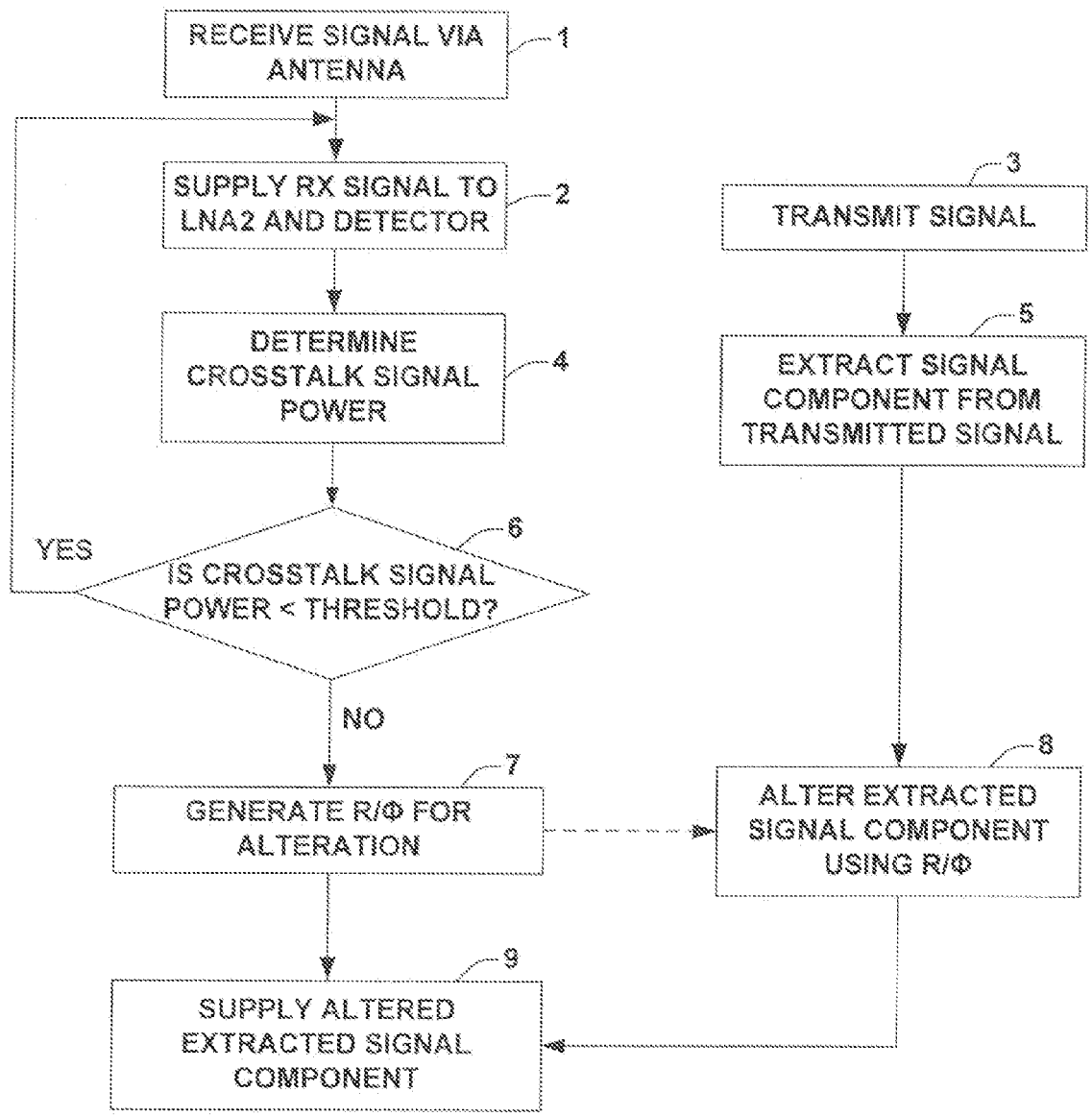
FIG. 3 is a flowchart illustrating a method of rejecting signal crosstalk according to yet another embodiment of the invention.
Figure 4:
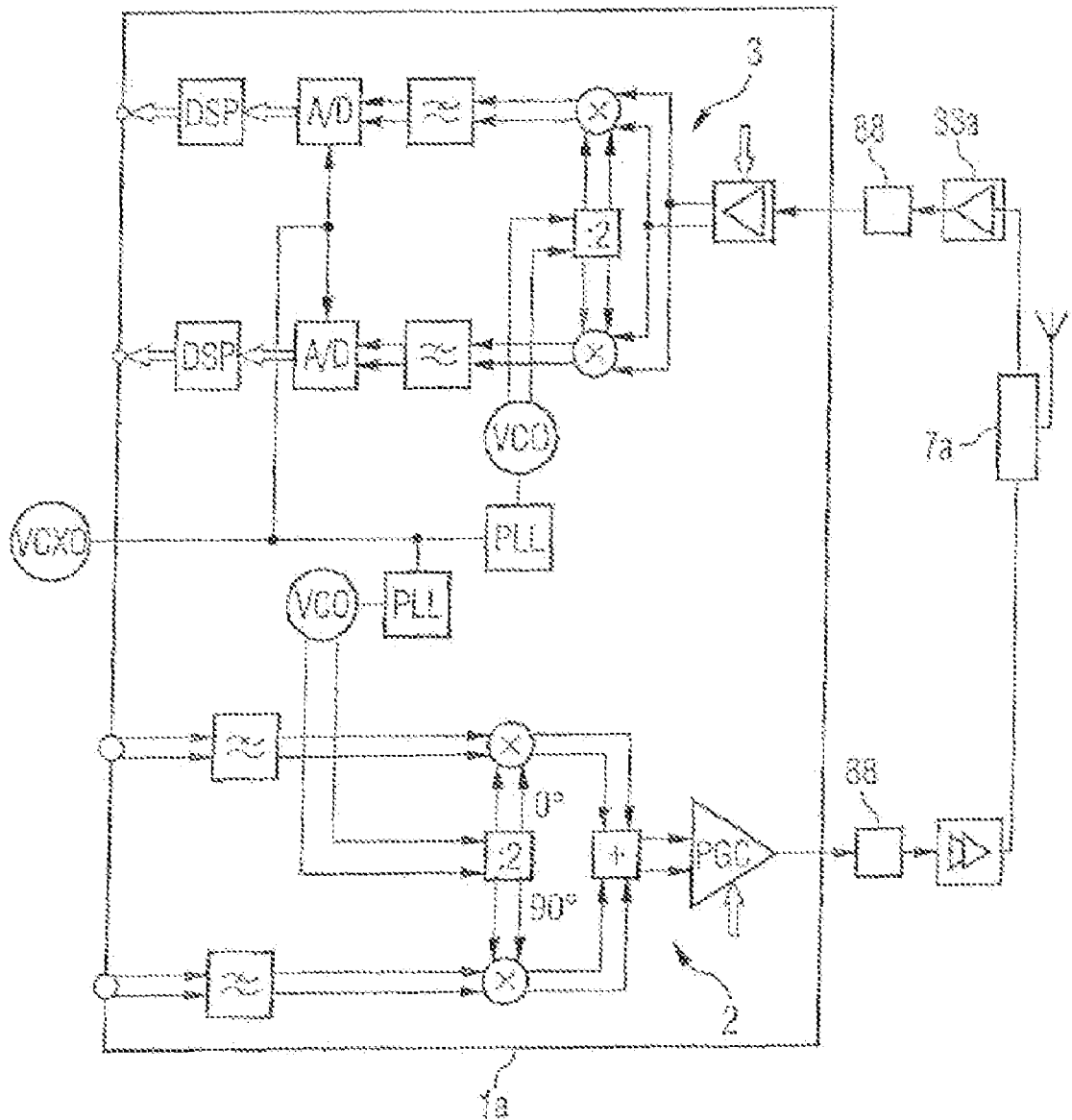
FIG. 4 is a block diagram illustrating a prior art transceiver.

FIG. 3 is a flowchart of the inventive method for rejecting a crosstalking signal component in the reception path. In step 1, a signal received via the antenna 8 is supplied to the transceiver's reception path via the duplexer 7*b* or the circulator. The first low-noise amplifier 33 is used to amplify it and to supply it to the input of the summator 49. In step 2, the received signal is applied both to the input of the second low-noise amplifier 34 and to the input of the detector 47*b*.

In step 4, the detector of power measurement processes the received signal and ascertains the power of the crosstalking signal component therefrom. It forwards this value to the microprocessor, which compares the value ascertained in this manner with a reference value in step 6. For the comparison, it is also possible to use further parameters, such as the bit error rate, or intermodulation products. If the comparison reveals the ascertained value to be below a particular threshold value, no further measures for rejecting a crosstalking component are taken, and a signal is received again in step 2. At the same time, the received signal is processed further and demodulated in step 4.

If the ascertained value is higher than the threshold value, however, then in step 7 the microprocessor produces an amplitude value and phase value, which are used to set an extracted transmitted signal component in order to reduce a crosstalking component in this manner.

The provision of an extracted transmitted signal component is shown by means of the second subflow in the flowchart in FIG. 3. In step 3, a signal is transmitted at a parallel time to the reception in step 1, and is supplied in the input of the transmission amplifier 6. As a result, a signal component is extracted by the extraction element in step 5. The parameters produced by the microprocessor in step 7 are supplied to the circuit 48, which in step 8 alters the signal which is extracted at the input from the transmitted signal in line with the parameters. In this case, the amplitude is attenuated or amplified an the phase is shifted. The signal whose amplitude and phase have been shifted in this manner is supplied to the adding element 49 in step 9. This element adds it to the signal applied to the input 42, which signal is then applied to the second power amplifier again and to the input of the detector.

The method is repeated with various amplitudes and phase values until minimum crosstalk by transmitted signal component is achieved. The algorithm used by the microprocessor is designed such that it results in optimum rejection in as few steps as possible. In particular, it recognizes when impairment occurs despite the supply of a signal whose amplitude and phase have been altered.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transceiver with interference signal rejection, comprising:

a transmission path comprising a frequency conversion device configured to send a transmitted signal to an output thereof;

a transmission amplifier coupled to the output of the transmission path and configured to amplify the transmitted signal;

an antenna coupled to an output of the transmission amplifier;

a reception path comprising a frequency conversion device configured to convert and send a signal applied to an input thereof, an input of the reception path being connected to the antenna; and a compensating circuit residing within the reception path, comprising:

a first input connected to a signal extraction element that is connected between the output of the transmission path and an input of the transmission amplifier;

a second input coupled to the antenna and forming the output of the reception path;

an output coupled to the input of the reception path;

wherein the compensating circuit is configured to reject a component of the transmitted signal that is applied to the second input thereof by crosstalking onto the input of the reception path; and wherein the signal extraction element is configured to perform inductive coupling to a signal line between the transmission path and the transmission amplifier, and wherein the rejection of the component of the transmitted signal by the compensating circuit is a function of the inductive coupling.

2. The transceiver of claim 1, wherein the second input of the compensating circuit comprises a reception amplifier connected upstream thereof, having an input coupled to the antenna.

3. The transceiver of claim 2, wherein the compensating circuit comprises a detector configured to measure power, wherein the detector is coupled to an output of the reception amplifier coupled to the antenna.

4. The transceiver of claim 3, wherein the detector comprises a diode rectifier configured to rectify a signal applied to an input thereof.

5. The transceiver of claim 3, wherein the detector is configured to measure the power of a signal applied to an input thereof in a first operating state, and a second operating state forms an inactive operating state with reduced power consumption associated therewith.

6. The transceiver of claim 5, wherein the first and second operating states of the detector are set by a signal that is derived from power regulation provided for the transmitted signal.

7. The transceiver of claim 3, wherein the detector is configured to send a discrete-value signal to a microcontroller for setting an amplitude shift and a phase shift for an extracted signal component.

8. The transceiver of claim 1, wherein at least the transmission path, the reception path, and the compensating circuit are formed in a semiconductor body as an integrated circuit.

9. The transceiver of claim 1, wherein the extraction element comprises a contact wire inductively coupled to an output of the transmission path, and wherein the contact wire is additionally configured to shield the transmission path.

10. The transceiver of claim 1, wherein the compensating circuit comprises a phase shift element configured to phase-shift a signal applied thereto on the basis of a setting signal at a setting input associated therewith.

11. The transceiver of claim 1, wherein the antenna is coupled to the transmission amplifier and to a reception amplifier via a duplexer or a circulator.

12. A method for rejecting crosstalk signals in a transceiver, comprising:
providing a transceiver having a transmission path and a reception path;
providing a transmission amplifier and a reception amplifier in the transmission path and the reception path, respectively;
producing a transmission signal in the transmission path;
inductively extracting a component of the transmission signal in the transmission path upstream of the transmission amplifier;
supplying the transmission signal to the transmission amplifier;
supplying a received signal having a crosstalk component therein that is associated with the transmission signal to the reception amplifier;
detecting a power associated with the crosstalk component;
comparing the detected power with a limit value;
producing a parameter if the detected power exceeds the limit value;
altering the extracted component of the transmission signal on the basis of the produced parameter;
supplying the altered extracted component to a received signal that has been amplified by the reception amplifier.

13. The method of claim 12, wherein altering the extracted component comprises amplifying and attenuating an amplitude of the extracted component, or altering a phase of the extracted component of the transmission signal, or both.

14. The method of claim 12, further comprising repeating the method with different parameters until a minimum is ascertained for the crosstalk component.

15. The method of claim 12, wherein detecting the power is carried out on the basis of an output power of the transmission signal.

16. A transceiver, comprising:
a transmission path and a reception path operably coupled to an antenna;
a compensation circuit associated with the reception path, and configured to generate a crosstalk compensation signal based on an extracted portion of a transmission signal in the transmission path, and further configured to add the crosstalk compensation signal to a received signal from the antenna in the reception path, thereby generating an altered received signal.

17. The transceiver of claim 16, further comprising an extraction circuit operably associated with the transmission path, and configured to generate the extracted portion of the transmission signal from an inductive coupling of the transmission signal.

18. The transceiver of claim 17, wherein the compensation circuit comprises a detector circuit configured to evaluate the altered received signal and generate a setting control signal in response to the evaluation, wherein the crosstalk compensation signal is a function of the setting control signal.

19. The transceiver of claim 18, wherein the detector circuit is further configured to detect a power associated with the received signal, and ascertain a degree of crosstalk of the transmission signal into the reception path based thereon.

20. The transceiver of claim 16, further comprising a power amplifier coupled to the antenna in the transmission path, wherein the extracted portion of the transmission signal is extracted from the transmission path upstream of the power amplifier.

* * * * *